July 25, 1950  J. M. COUGHLIN  2,516,617
AUTOMOBILE COAT HANGER SUSPENSION MEANS
Filed March 18, 1949
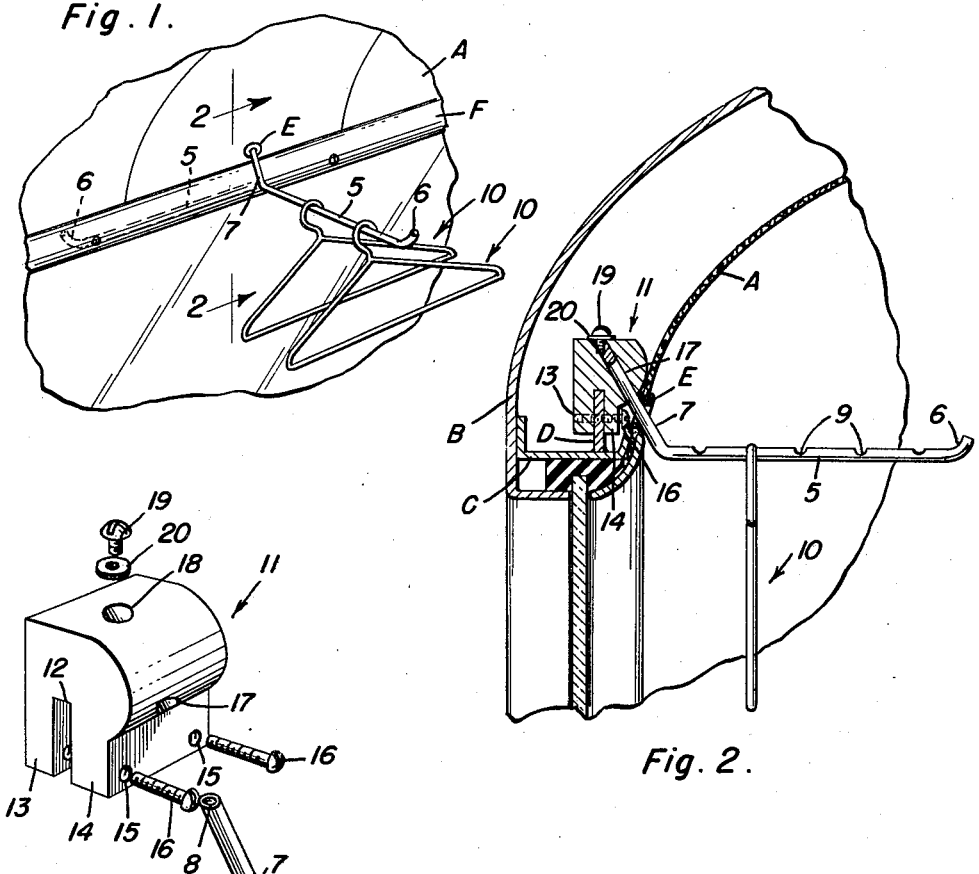
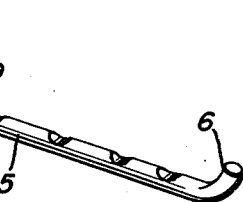
Inventor
John M. Coughlin
By Clarence A. O'Brien
and Harvey B. Jacobson
Attorneys Patented July 25, 1950

2,516,617

UNITED STATES PATENT OFFICE 2,516,617

AUTOMOBILE COAT HANGER SUSPENSION MEANS

John M. Coughlin, Elmira, N. Y.

Application March 18, 1949, Serial No. 82,077

2 Claims. (Cl. 224—42.45)

This invention relates to a novel suspension device which is especially, but not necessarily, designed and adapted for use in the tonneau of an automobile or similar vehicle and which is aptly suited to suspend a plurality of wire or equivalent type garment hangers.

One object of the invention is to provide a simple, economical, practical and reliable suspension fixture or device wherein users will find their needs fully met, contained and conveniently available, and which is susceptible of being located so that its use will not interfere with or hamper the driver's vision.

Another object of the invention is to provide a suspension device which is characterized by a suspension arm which, when not in use, may be folded to a convenient out-of-the-way position.

In reducing to practice a preferred embodiment of my inventive concept, I contemplate the adoption and use of a simple and successfully usable suspension arm or bracket which is attached at one end to a special adapter, the latter being so made and coordinated with the arm that it may be installed between the roof of the car and overhead upholstery and thus successfully anchored in a concealed position on an existing flange forming a part of the superstructure between the roof and stated upholstery.

Then, too, it is a further objective to form the stated bracket arm with an offset or angular end portion which functions as a journal and which is journaled for rotation in a diagonal bearing in the stated adapter, whereby to permit a portion of the journal to operate in a restricted opening in the coacting ceiling upholstery.

A still further object of the invention is to provide a suspension device for a plurality of garment hangers which is such in construction that it may be incorporated for use at the time of manufacture of the automobile or may be installed as an added accessory by those who find need for same.

Other objects and advantages will become more readily apparent from the following description and the accompanying illustrative drawings.

In the sheet of drawings, wherein like numerals are employed to designate like parts throughout the views:

Figure 1 is a fragmentary perspective view showing a portion of an automobile or the like and showing the suspension arm of my improved device projected and in use.

Figure 2 is an enlarged fragmentary sectional and elevational view taken on the plane of the vertical line 2—2 of Figure 1, looking in the direction of the arrows.

Figure 3 is a perspective view showing the various parts which go to make up the complete attachment-type suspension device.

The bracket arm, the principal suspension element, is a metal or equivalent rod of suitable proportions and length denoted by the numeral 5 and having an upturned safety hook 6 at one end and having its opposite end bent at an obtuse angle to provide the aforementioned assembling and hinging journal 7. The latter is axially provided with a screw-threaded socket 8. The upper surface of the rod has keeper notches 9 for the garment hangers 10. The adapter unit is denoted by the numeral 11 and is of suitable material and shape and resembles what may be visualized as a block and the lower or bottom portion thereof is bifurcated, as at 12, and the furcations 13 and 14 constitute applicator and retaining jaws. The jaw 14 has two holes 15 (see Fig. 3) registering with similar holes in flange D and, in turn, with screw-threaded holes 15ª in jaw 13, thus to accommodate assembling and attaching screws 16 (see Fig. 2). A diagonal passage is formed through the adapter and the lower end opens as at 17, and the upper end opens through the top as at 18. This diagonal passage provides a bearing for the correspondingly angled journal 7. The journal is passed upwardly through the bearing and an assembling and retaining screw 19 is threaded through a washer 20 and then screwed into the aforementioned accommodation socket 8.

In Figure 2, the overhead or ceiling upholstery is denoted at A and the roof of the car at B. The framework, commonly referred to as the superstructure, is denoted at C. This is generally in the form of a channel iron and has a so-called beam or flange D running lengthwise of the channel. It is to this flange that the adapter unit or block 11 is fastened. In practice, the jaws 13 and 14 are placed to straddle the flange and the set screws 16 are tightened to hold the adapter in place. When in position, it is concealed between the upholstery A and roof B. The upholstery is then formed with a small opening to allow for protrusion and operation of the axially turnable journal 7. If desired, an ornamental grommet or eyelet E may be installed in the opening for finishing purposes. With the bracket arm thus hinged on the adapter unit and workable through the opening in the upholstery, it will be seen that it may be swung either forwardly or rearwardly and against the molding F to a convenient out-of-the-way position. The hinge connection between the journal and adapter may be possessed of sufficient friction that when the bracket arm is extended at right angles and into the body of the car, it stays put. Therefore, when the bracket arm is in the full line position shown in Figure 1, it provides a satisfactory support and suspension means for a plurality of garment hangers. Due to the construction of the adapter unit 11, it is obvious that it may be located at a point of vantage in respect to the forward and rear portions of the car to be out of the way of passengers and to minimize the possibility of the hanger equipped arm hampering the vision of the driver when the car is in motion.

Novelty is predicated upon the combination of structural parts depicted in Figure 2, wherein a complete assemblage, in use, is disclosed. In addition, novelty is predicated upon the device purely as an attachment and possessed of the structural details depicted in Figure 3.

By considering the showing of the details of the attachment seen in Figure 3 and then combinedly considering the attachment in place as shown in Figures 1 and 2, a comprehensive appreciation of the invention and its mode of attachment and use will be clear to the reader.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and within the scope of the appended claims.

Having described the invention, what is claimed as new is:

1. In a structure of the class described, in combination, a superstructure framework including a longitudinally extending horizontally disposed flange, a roof on one side of the flange, and ceiling upholstery on the other side of the flange, said upholstery having an opening, an adapter unit having jaws straddling and detachably mounted on said flange, said adapter unit being further provided with a bore constituting a bearing, an arm having a laterally bent end portion constituting a journal, said journal being removably and rotatably mounted in said bore.

2. Means for use in an automobile whereby a plurality of conventional-type garment hangers may be removably attached thereto and suspended therefrom comprising an adapter block, said block being bifurcated and the furcations constituting attaching and retaining jaws, the latter being adapted to straddle a flange on a part of the super structure in said vehicle, one of said jaws having set screws for detachable association with said flange, said block being provided with an obliquely disposed bore constituting a bearing, and an arm having an upturned guard hook at one end and having an obtuse angled bend at the opposite end, said bend constituting a journal, said journal being removably and rotatably mounted in said bore.

JOHN M. COUGHLIN.

REFERENCES CITED

The following references are of record in the file of this patent:

UNITED STATES PATENTS

| Number | Name | Date |
|---|---|---|
| 888,032 | Peterson | May 19, 1908 |
| 1,472,491 | Peck | Oct. 30, 1923 |
| 1,910,091 | Collier | May 23, 1933 |
| 2,284,502 | Westrope | May 26, 1942 |
| 2,447,908 | Hoots | Aug. 24, 1948 |